US012646324B2

(12) United States Patent
Gao et al.

(10) Patent No.: US 12,646,324 B2
(45) Date of Patent: Jun. 2, 2026

(54) DETECTING ITEMS IN A SHOPPING CART BASED ON LOCATION OF SHOPPING CART

(71) Applicant: Maplebear Inc., San Francisco, CA (US)

(72) Inventors: Lin Gao, Miami, FL (US); Yilin Huang, Shanghai (CN); Shiyuan Yang, Shanghai (CN); Xiaofei Zhou, Shanghai (CN); Xiao Zhou, Shanghai (CN); Qunwei Liu, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 639 days.

(21) Appl. No.: 18/060,473

(22) Filed: Nov. 30, 2022

(65) Prior Publication Data

US 2024/0144688 A1 May 2, 2024

Related U.S. Application Data

(63) Continuation of application No. PCT/CN2022/127935, filed on Oct. 27, 2022.

(51) Int. Cl.
*G06V 20/52* (2022.01)
*G06Q 30/0601* (2023.01)
*G06V 10/74* (2022.01)

(52) U.S. Cl.
CPC ......... *G06V 20/52* (2022.01); *G06Q 30/0633* (2013.01); *G06V 10/761* (2022.01)

(58) Field of Classification Search
CPC ... G06V 20/52; G06V 10/761; G06Q 30/0633
See application file for complete search history.

(56) References Cited

U.S. PATENT DOCUMENTS 11,087,273 B1 * 8/2021 Bergamo ............... G06V 10/82
11,288,472 B2 * 3/2022 Rodriguez ......... G06V 30/2247
(Continued)

FOREIGN PATENT DOCUMENTS

| CN | 108960038 A | 12/2018 |
| CN | 109643423 A | 4/2019 |
| CN | 114331535 A | 4/2022 |

OTHER PUBLICATIONS

PCT International Search Report and Written Opinion, PCT Application No. PCT/CN2022/127935, Jan. 18, 2023, 9 pages.

*Primary Examiner* — Solomon G Bezuayehu
(74) *Attorney, Agent, or Firm* — Fenwick & West LLP

(57) ABSTRACT

An automated checkout system accesses an image of an item inside a shopping cart and a location of the shopping cart within a store. The automated checkout system identifies a set of candidate items located within a threshold distance of the location of the shopping cart based on an item map. The item map describes a location of each item within the store and the location of each candidate item corresponds to a location of the candidate item on the item map. The automated checkout system inputs visual features of the item extracted from the image to a machine-learning model to identify the item by determining a similarity score between the item and each candidate item of the set of candidate items. After identifying the item, the automated checkout system displays a list comprising the item and additional items within the shopping cart to a user.

18 Claims, 4 Drawing Sheets

(56)         References Cited

U.S. PATENT DOCUMENTS

| | | | |
|---|---|---|---|
| 11,430,044 B1 * | 8/2022 | Maron ................. | G06V 10/751 |
| 2009/0132483 A1 * | 5/2009 | Yang ................. | G06F 16/24535 |
| 2015/0161458 A1 * | 6/2015 | Agnew ................ | G06V 20/584 |
| | | | 382/104 |
| 2018/0197218 A1 * | 7/2018 | Mallesan ............. | G07G 1/0054 |
| 2018/0218351 A1 * | 8/2018 | Chaubard ............ | G06Q 20/208 |
| 2019/0034440 A1 * | 1/2019 | Li ........................... | G06F 16/29 |
| 2021/0201676 A1 * | 7/2021 | Tariq ................ | G08G 1/096725 |
| 2021/0209664 A1 * | 7/2021 | Ketchel, III .......... | G16H 10/60 |
| 2021/0241348 A1 * | 8/2021 | Ovenc ................ | G06Q 30/0631 |
| 2021/0284223 A1 * | 9/2021 | Carter ................ | G06Q 20/4015 |
| 2022/0198550 A1 | 6/2022 | Meidar et al. | |
| 2025/0022003 A1 * | 1/2025 | Nigul ................ | G06Q 30/0205 |

* cited by examiner

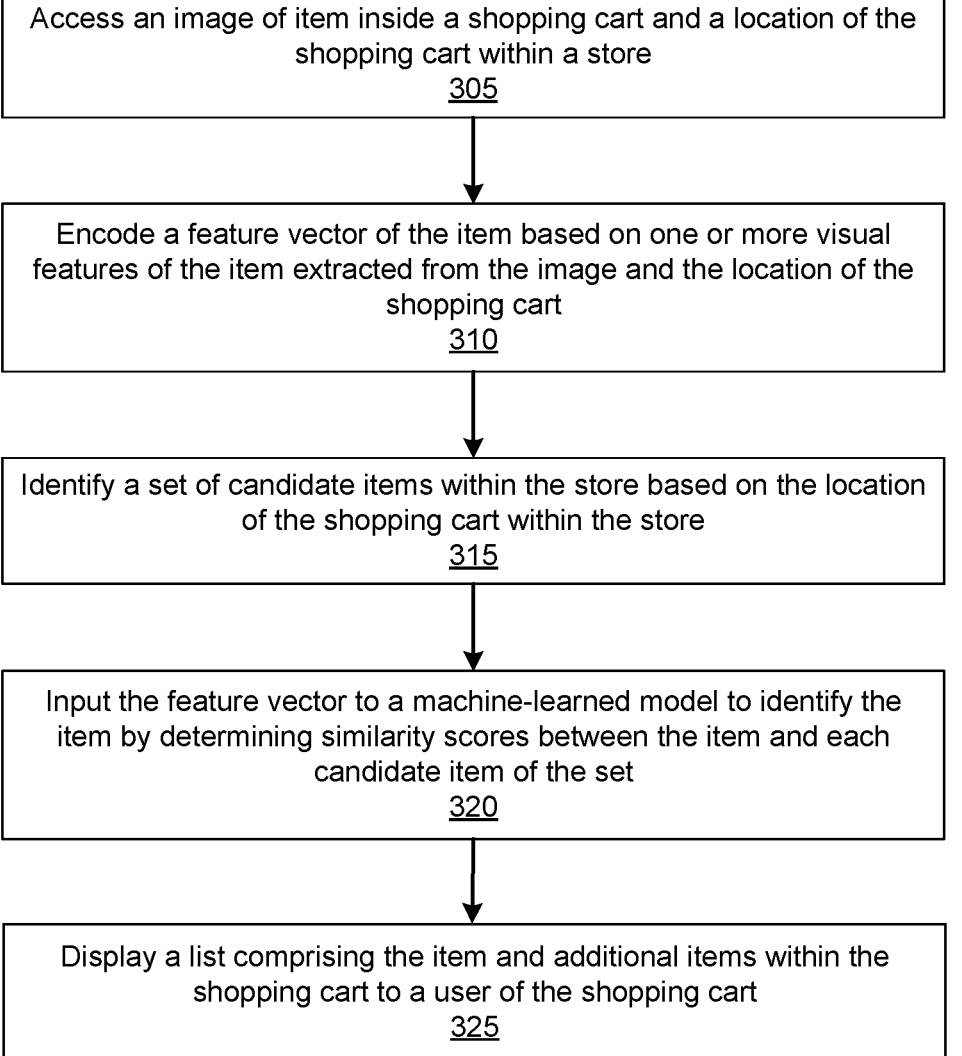

Access an image of item inside a shopping cart and a location of the shopping cart within a store
305

Encode a feature vector of the item based on one or more visual features of the item extracted from the image and the location of the shopping cart
310

Identify a set of candidate items within the store based on the location of the shopping cart within the store
315

Input the feature vector to a machine-learned model to identify the item by determining similarity scores between the item and each candidate item of the set
320

Display a list comprising the item and additional items within the shopping cart to a user of the shopping cart
325

FIG. 3

DETECTING ITEMS IN A SHOPPING CART BASED ON LOCATION OF SHOPPING CART

CROSS REFERENCE TO RELATED APPLICATIONS

This application is a continuation of International PCT Patent Application No. PCT/CN2022/0127935 filed on Oct. 27, 2022, which is incorporated by reference in its entirety.

BACKGROUND

Traditional brick-and-mortar stores with human attendants and cashiers generally provide shopping carts and/or baskets to users for use in holding items to be purchased. When ready to checkout, the users present their items to a human cashier who manually scans each and every item.

Automated checkout systems allow a customer at a brick-and-mortar store to select and purchase items all without aid from a human attendant. Automated checkout systems aim to streamline such processes by capturing images of items inside the shopping cart and identifying items placed in the shopping cart from the captured images. However, stores are filled with items, many of which look visually similar to other items. As a result, automated checkout systems often inaccurately identify items within the shopping cart or are entirely incapable of identifying items within the shopping cart.

SUMMARY

In accordance with one or more aspects of the disclosure, an automated checkout system uses a shopping cart to capture images of items within the shopping cart and to track the location of the cart within the store. The automated checkout system accesses an image of an item inside the shopping cart and a location of the shopping cart within a store at the time when the image was captured. Rather than search through every item in the store, the automated checkout system preserves computing resources and improves processing efficiency by identifying a set of candidate items. The automated checkout system identifies the set of candidate items by comparing the location of the cart to locations of items within the store according to an item map representing the floor of the store. The item map describes the location of each item within the store in a two or three-dimensional space and the location of each candidate item corresponds to a location of the candidate item on the item map. Using the item map, the automated checkout system filters all the items in the store down to only those items located within a threshold distance of the location of the cart.

The automated checkout system inputs visual features of the item extracted from the image and the location of the cart to a machine-learning model that is trained to identify the item by determining a similarity score between the item and each candidate item of the set of candidate items. The machine-learning model is trained to determine the similarity score between the item and a candidate item based on the one or more visual features of the item and stored visual features of the candidate item. When the automated checkout system identifies the item, it displays an updated shopping list to a user that comprises the item and additional items within the cart.

BRIEF DESCRIPTION OF DRAWINGS

FIG. 3 is a flowchart illustrating an example method for identifying items in a shopping cart based on the location of the shopping cart within a store, in accordance with one or more embodiments.

DETAILED DESCRIPTION

Example System Environment for Automated Checkout System

Figure 1:
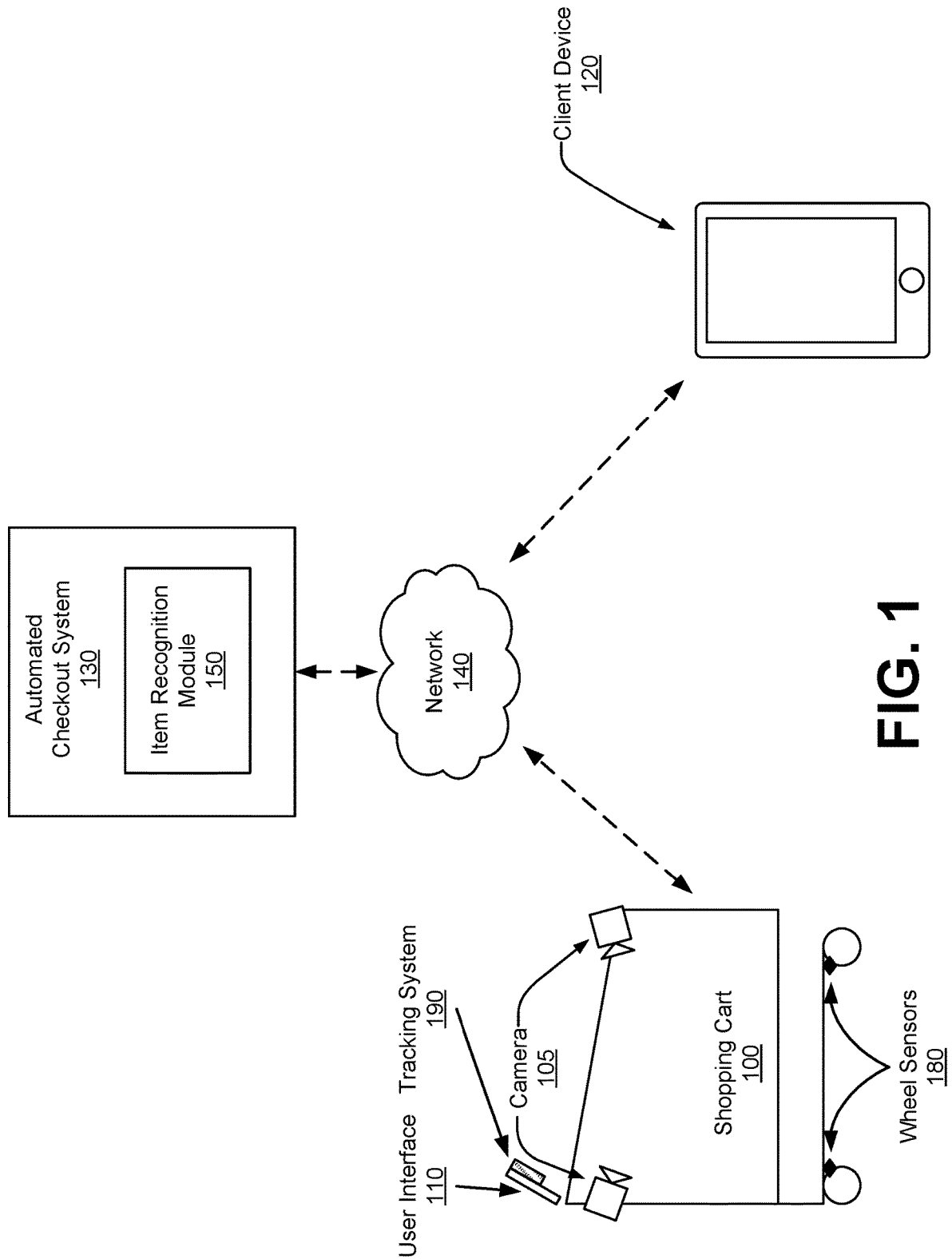
FIG. 1 illustrates an example system environment for an automated checkout system, in accordance with one or more embodiments.

FIG. 1 illustrates an example system environment for an automated checkout system, in accordance with one or more embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in one or more embodiments, by the automated checkout system 130 or the client device 120. Similarly, functionality described below as being performed by the automated checkout system 130 may, in one or more embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In one or more embodiments, the cameras 105 include embedded processing capabilities to process image data captured by the cameras 105. For example, the cameras 105 may be MIPI cameras.

The shopping cart 100 may include one or more sensors (not shown) that capture measurements describing the shopping cart 100, items in the shopping cart's storage area, or the area around the shopping cart 100. For example, the shopping cart 100 may include load sensors that measure the weight of items placed in the shopping cart's storage area. Similarly, the shopping cart 100 may include proximity sensors that capture measurements for detecting when an item is being added to the shopping cart 100. The shopping cart 100 may transmit data from the one or more sensors to the automated checkout system 130.

In one or more embodiments, the shopping cart 100 captures image data in response to detecting that an item is being added to the storage area. The shopping cart 100 may detect that an item is being added based on sensor data from sensors on the shopping cart 100. For example, the shopping cart 100 may detect that a new item has been added when the shopping cart 100 detects a change in the overall weight of the contents of the storage area based on load data from load sensors. Similarly, the shopping cart 100 may detect that a new item is being added based on proximity data from proximity sensors indicating that something is approaching the storage area of the shopping cart 100. The shopping cart 100 captures image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In one or more embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

A user can also interact with the shopping cart 100 or the automated checkout system 130 through a client device 120. The client device 120 can be a personal or mobile computing device, such as a smartphone, a tablet, a laptop computer, or desktop computer. In one or more embodiments, the client device 120 executes a client application that uses an application programming interface (API) to communicate with the automated checkout system 130 through the network 140.

The shopping cart 100 includes one or more wheel sensors 180 that measure wheel motion data of the one or more wheels. The wheel sensors 180 may be coupled to one or more of the wheels on the shopping cart. In one or more embodiments, a shopping cart 100 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor 180 may be a rotary encoder, a magnetometer with a magnet coupled to the wheel, an imaging device for capturing one or more features on the wheel, some other type of sensor capable of measuring wheel motion data, or some combination thereof.

The shopping cart 100 includes a tracking system 190 configured to track a position, an orientation, movement, or some combination thereof of the shopping cart 100 in an indoor environment. The tracking system 190 may be a computing system comprising at least one processor and computer memory. The tracking system 190 may further include other sensors capable of capturing data useful for determining position, orientation, movement, or some combination thereof of the shopping cart 100. Other example sensors include, but are not limited to, an accelerometer, a gyroscope, etc. The tracking system 190 may provide real-time location of the shopping cart 100 to an online system and/or database. The location of the shopping cart 100 may inform content to be displayed by the user interface 110. For example, if the shopping cart 100 is located in one aisle, the display can provide navigational instructions to a user to navigate them to a product in the aisle. In other example use cases, the display can provide suggested products or items located in the aisle based on the user's location.

International Application No. PCT/CN2022/102796, filed Jun. 30, 2022, describes wheel sensors 180 and the tracking system 190 in more detail and is incorporated by reference herein in its entirety.

The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 adjust the user's shopping list based on the identified item. In one or more embodiments, the user can also manually adjust their shopping list through the client device 120.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In one or more embodiments, the network 140 may include Bluetooth or near-field communication (NFC) technologies or protocols for local communications between computing devices. The network 140 may transmit encrypted or unencrypted data.

The automated checkout system 130 allows a customer at a brick-and-mortar store to complete a checkout process in which items are scanned and paid for without having to go through a human cashier at a point-of-sale station. The automated checkout system 130 receives data describing a user's shipping trip in a store and generates a shopping list based on items that the user has selected. For example, the automated checkout system 130 may receive image data from a shopping cart 100 and may determine, based on the image data, which items the user has added to their cart. When the user indicates that they are done shopping at the store, the automated checkout system 130 facilitates a transaction between the user and the store for the user to purchase their selected items. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In one or more embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100.

The automated checkout system 130 generates a shopping list for the user as the user adds items to the shopping cart 100. The shopping list is a list of items that the user has gathered that the user intends to purchase. The shopping list may include identifiers for the items that the user has gathered (e.g., SKUs) and a quantity for each item. As illustrated in FIG. 1, the automated checkout system 130 comprises an item recognition module 150, which identifies items that the user places in their shopping cart. To generate the shopping list, the item recognition mode 150 analyzes image data captured by the cameras 105 on the shopping cart 100. For example, the automated checkout system 130 may apply a machine-learning model (e.g., a neural network) to image data from the shopping cart 100 to identify an item added to the cart.

In one or more embodiments, the item recognition module 150 uses a barcode detection model to identify items in the shopping cart's storage area. A barcode detection model is a machine-learning model that is trained to identify items by identifying barcodes on the items based on image data from the cameras 105. The barcode detection model identifies portions of the image data that correspond to a barcode on an item and determines the item identifier (e.g., SKU) that is represented by the barcode.

In other embodiments, the item recognition module 150 uses an image recognition model to identify items in the shopping cart's storage area. The image recognition model is a machine-learning model that is trained to identify items based on visual characteristics of the items captured in the image data from the cameras 105. The image recognition model identifies portions of the image that correspond to each item and matches the item to a candidate item within the store. The item recognition module 150 may additionally filter candidate items within the store based on the location of the shopping cart within the store and a known or anticipated location of each candidate item within the store. The tracking system 190 determines the location of the shopping cart within the store as described above.

The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

In one or more embodiments, a user who interacts with the shopping cart 100 or the client device 120 may be a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

Example Item Recognition Module

The item recognition module 150 implements a machine-learning model to identify an item placed in a shopping cart 100 based on images of the item captured by the cameras 105 and the location of the shopping cart 100 within the store. The item recognition module 150 inputs the captured images to the machine-learning model, which identifies the item from a set of candidate items. As described above, the tracking system 190 tracks the location of the shopping cart 100 within the store. The item recognition module 150 identifies the set of candidate items based on the location of the shopping cart 100 within the store. For example, the item recognition module 150 narrows down items within the store to a set of candidate items to only a set of candidate items located within a threshold distance of the shopping cart 100.

Figure 2:
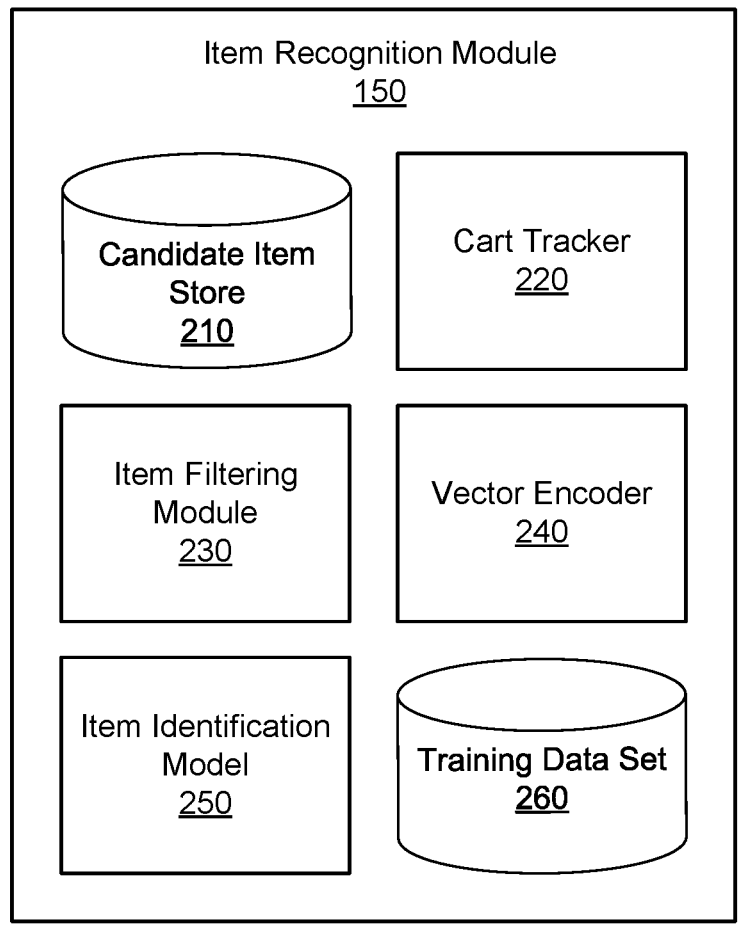
FIG. 2 illustrates an example system architecture for an item recognition module, in accordance with one or more embodiments.

FIG. 2 illustrates an example system architecture for an item recognition module 150, in accordance with one or more embodiments. The item recognition module 150 includes a candidate item store 210, a cart tracker 220, an item filtering module 230, a vector encoder 240, an item identification model 250, and a training data set 260. Alternative embodiments may include more, fewer, or different components from those illustrated in FIG. 2, and the functionality of each component may be divided between the components differently from the description below. Additionally, the item recognition module 150 illustrated in FIG. 2 may be the same item recognition module 150 illustrated in FIG. 1.

The candidate item store 210 maintains a record of each item available within a store. Each item is labeled with a unique identifier of the item and a location of the item within the store. The candidate item store 210 may also store one or more images of the item labeled with the unique identifier of the item and a known location of the item within the store. For example, where the item is a particular bag of chips, the candidate item store 210 stores one or more images of that particular bag of chips with a label comprising a unique identifier for that particular bag of chips and the aisle of the store where that particular bag of chips may be found. In one or more embodiments, the candidate item store 210 may additionally store features of an item extracted from labeled images of the item (e.g., color, shape, texture, etc.). Depending on the inventory preferences of a store, the candidate item store 210 may define items at varying levels of granularity. For example, the candidate item store 210 assigns different brands of the same item (e.g., different brands of potato chip) different unique identifiers and relates the unique identifier to images of the particular brand of item and the location of the particular brand of item. As another example, one brand may offer different sizes or varieties of the same item. Accordingly, the candidate item store 210 assigns each size or variety of the item (e.g., different sized bags of the same brand of potato chip) a unique identifier and relates the unique identifier to images of the particular variety and the location of the particular variety.

Information within the candidate item store 210 may be stored in lookup tables indexed by unique identifiers. For example, each row of the lookup table may include the unique identifier of an item, labeled images of the item, features extracted from the labeled images of the item, the location of item within the store, or a combination thereof. The candidate item store 210 may be updated at periodic intervals or in response to a trigger event, for example a new image of an item captured by the cameras 105. Such periodic updates ensure that the candidate item store 210 stores the most recent (or updated) images of a content and reflect the most up-to-date offerings within the store.

The cart tracker 220 accesses the real-time location of the shopping cart 100, which the tracking system 190 determines using a self-tracking algorithm to continuously track the location of the shopping cart 100. The tracking system 190 may maintain a locally-stored map of the indoor environment. The tracking system 190 may receive information on the layout of the indoor environment, e.g., placement of shelves, tables, automated checkout systems, external wireless devices, etc. Upon self-tracking, the tracking system 190 may update its real-time location on the locally-stored map. At some frequency, the tracking system 190 may synchronize with an online system storing a global map to provide updates on the location of the shopping cart 100. The online system may further communicate updated information on the layout of the indoor environment, e.g., if fixtures move, or if some checkout lanes close, etc. The tracking system 190 may broadcast an interrogation pulse into the indoor environment of the store. The interrogation pulse triggers wireless devices positioned around the indoor environment to provide response signals. The tracking system 190 may determine a location of the shopping cart 100 based on the response signals. In one or more embodiments, the tracking system 190 may calculate distances between the shopping cart 100 and the various wireless devices to triangulate the location of the shopping cart 100.

In one or more embodiments, the tracking system 190 continuously updates the location of the shopping cart 100 and the cart tracker 220 accesses the current location of the shopping cart 100. In other embodiments, the tracking system 190 updates the location of the shopping cart 100 at periodic intervals and the cart tracker 220 accesses the most recent location of the shopping cart 100. In other embodiments, the tracking system 190 updates the location of the shopping cart 100 in response to a request from the cart tracker 220 or another trigger event and the cart tracker 220 accesses the most recent location of the shopping cart 100.

As a starting point, when the cameras 105 capture an image of an item(s) in a shopping cart 100, the item identification model 250 considers every item in the store to identify the item in the image. However, for larger stores with a vast array of items, the recognition process can be time-consuming and require significant processing capacity. However, the location of the shopping cart 100 within the store informs the items that a user is most likely to place in their shopping cart 100. For example, if the shopping cart 100 is located in the fruit aisle, it is more likely that an item placed in the shopping cart 100 is a fruit than a canned good. Accordingly, the item filtering module 230 considers the location within the shopping cart 100 (accessed by cart tracker 220). The item identification model 250 identifies items within the cart in a computationally more efficient manner by first comparing the item in the cart to a filtered set of candidate items in proximity to the shopping cart. The item identification model 250 is further described below.

In a first implementation, the item filtering module 230 filters out any items in the candidate item store 210 that are located beyond a threshold distance from the shopping cart. Accordingly, the item filtering module 230 identifies a subset of candidate items within the threshold distance of the shopping cart 100. When determining the threshold distance, the item filtering module 230 may consider various factors including the length of the aisle, the number of items in the aisle, the overall size of the store, the overall number of items within the store, the frequency with which users select items from the aisle, the frequency with which users select particular items and the location of the particular items within the aisle, or any other suitable factor.

In one or more embodiments, the item filtering module 230 may extend radii satisfying the threshold distance in all directions from the center of the shopping cart and filter out any candidate item in the store beyond the radii. Each of the radii may not exceed the threshold distance such that the radii define a boundary around the shopping cart. The item filtering module 230 adds all items within the boundary to the subset of candidate items and excludes all items beyond the boundary from the subset of candidate items.

In another embodiment, the item filtering module 230 defines the threshold distance as a function of the location of the shopping cart 100 relative to the aisle. The item filtering module 230 may define the threshold distance based on the distance from the center of the shopping cart to either end of the aisle. The item filtering module 230 may define multiple radii extending from the center of the shopping cart at different lengths such that all items in the aisle are included in the subset of candidate items. For example, where the shopping cart is located in the middle of an aisle, the item filtering module 230 may extend the two longest radii to each end of the aisle with smaller radii extending to sections of the aisle between the two ends.

The item filtering module 230 may dynamically adjust the boundary around the shopping cart by adjusting the length of one or more radii as the shopping cart moves up and down the aisle. For example, as the shopping cart moves from the middle of the aisle to the left end of the aisle, the item filtering module 230 reduces the length of radii extending toward the left end and increases the length of radii extending toward the right end. In one or more embodiments, the item filtering module 230 may define a threshold distance that extends only part way down either side of the aisle.

Additionally, where the shopping cart 100 is located between two parallel aisles (e.g., aisles on both sides of the shopping cart), the item filtering module 230 applies a first set of radii extending from the shopping cart 100 along the right aisle and a second pair of radii extending from the shopping cart 100 along the left aisle. The item filtering module 230 dynamically adjusts each pair of radii as the shopping cart 100 moves up and down an aisle in the manner described above.

The item filtering module 230 determines the set of candidate items by identifying items within the boundary around the shopping cart. The item filtering module 230 identifies items within the boundary of the shopping cart using an item map of the store. The item map identifies the locations within the store where items are displayed for collection by users or shoppers in the store. The item map stores the location of items in the store in a two-dimensional plane representing the floor of the store. The item map can also store item locations in a third dimension. For example, the item map may indicate on which level of a set of shelves an item is displayed. In one or more embodiments, the item map is a planogram specifying where items should be displayed in the store. The item filtering module 230 (and more generally the automated checkout system 130) uses the location of the shopping cart and the item map to determine which items are located within the boundary defined for the shopping cart.

In one or more embodiments, the item placed in the shopping cart 100 may not be selected from the items within the threshold radius of the shopping cart. Consider a user who leaves their shopping cart between two cereal aisles to select a carton of milk from a different aisle outside the threshold radius before returning to the shopping cart in the cereal aisle. The carton of milk is not a candidate item within a boundary of the shopping cart because the carton of milk is not located in either of the cereal aisles. Accordingly, the item identification model 250 will not find a match between the carton of milk and any of the filtered subset of candidate items. In such embodiments, the item filtering module 230 may extend the boundary of the shopping cart 100 to cover the next adjacent aisle on one or both sides. The item filtering module 230 may iterate this process until the filtered subset of candidate items includes the matching items.

The candidate item store 210 may store relationships between items in a store that are frequently bought together or items that are known to be related to each other. For example, the candidate item store 210 may store a relationship that milk is often bought with cereal, chips are often bought with salsa, or spaghetti is often bought with meatballs. The item filtering module 230 may supplement the filtered subset of candidate items by adding secondary items according to the relationships stored in the candidate item store. Returning the above example of a user in the cereal aisle, the item filtering module 230 may add various milk to the filtered subset of candidate items given the relationship between milk and cereal. Relationships between items may be defined or assigned manually by an operator or extracted from historical data including shopping lists and checkouts from previous users.

In a second implementation, the item filtering module 230 may consider the distance between each item in the store and the shopping cart 100. In one or more embodiments, the candidate item store 210 stores the location of each item in a coordinate space representing the store, for example the item map. The item filtering module 230 determines a distance between the coordinate location of the item and the location of the shopping cart 100 within the coordinate space representing the store. In one or more embodiments, the item filtering module 230 determines the distance between the location of the item and the location of the shopping cart 100 without considering the layout of the store. In other embodiments, the item filtering module 230 determines the distance between the location of item and the location of the shopping cart 100 while considering the layout of the store. The item filtering module 230 may access the map of the store implemented by the tracking system 190 to identify paths that a user could actually take from the shopping cart 100 to the item (e.g., actual walkways) and determine the distance of the shortest path.

The item filtering module 230 may assign items to tiers based on the distance between each item and the shopping cart 100 such that each tier represents a range of distances. The item filtering module 230 may rank each tier in order of closest distances to farthest. When identifying an item in the shopping cart 100, the item identification model 250 first considers candidate items in the tier representing the closest distances. If a match is not found within that batch, the item filtering module 230 may iterate through each tier in order of increasing distances until the item identification model 250 identifies a matching candidate item.

In other embodiments, the item filtering module 230 only provides the tier of the closest candidate items to the item identification model 250. If the item identification model 250 does not find a match between an item in the shopping cart 100 and the tier of the closest candidate items, the item filtering module 230 may supplement the tier with additional items based on relationships between items stored in the candidate item store 210 as discussed above.

In a third implementation, the item filtering module 230 ranks every item in the store based on the distance between the item and the shopping cart, such that the closer the item to the cart the higher the item is ranked. The item filtering module 230 ranks all items within the store according to their distance from the shopping cart 100 and identifies candidate items as those ranked above a threshold ranking. When input to the item identification model 250, the item identification module 250 may sequentially compare an item to each candidate item in the store in order from highest ranked item to lowest ranked item (e.g., the closest item to the farthest item) until a match is found.

The item identification model 250 analyzes features extracted from an image to identify an item in the image, for example by matching features of the item to features of a candidate item stored in the store 210. Accordingly, the vector encoder 240 extracts visual features of the item from the image and encodes the extracted features into a format to be input to the item identification model 250, for example a feature vector (also referred to as a "component vector"). The vector encoder 240 receives features of an item extracted from an image and generates a feature vector from the extracted features. As described herein, a feature vector is a representation of the feature data extracted from an image, which may be processed by a machine-learning model (e.g., the item identification model 250) to identify the item within the image.

The vector encoder 240 extracts visual features of an item from an image of the item, for example using an optical character recognition algorithm or any other suitable visual analysis technique. Examples of visual features extracted for an item include, but are not limited to, size of the item, shape of the item, color of the item, etc. The vector encoder 240 encodes a feature vector for the item based on the extracted visual features. Additionally, in one or more embodiments, the vector encoder 240 accesses the location of the shopping cart 100 from the cart tracker 220 and adds a feature representing the location of the shopping cart to the encoded feature vector for the item. As described above, the location of the shopping cart may inform the types of items being placed in the shopping cart. For example, if the shopping cart 100 is located in the produce aisle and an orange spherical item is placed in the cart, encoding the location of the shopping cart 100 into the feature vector of the item may inform the item identification model 250 that the item is an orange rather than a basketball.

As described above, the item recognition module 150 applies machine-learning based techniques to identify an item in an image captured by the cameras 105 based on visual features extracted from the image and/or the location of the shopping cart 100 within the store. In particular, the item identification model 250 analyzes features extracted for the item to determine similarity scores between the item and each candidate item identified by the item filtering module 230. To identify an item, the item identification model 250 may be a mathematical function or other more complex logical structure, trained using a combination of features stored in the training data set 260 to determine a set of parameter values stored in advance and used as part of the identification analysis. As described herein, the term "model" refers to the result of the machine learning training process. Specifically, the item identification model 250 describes the function for identifying an item and the determined parameter values incorporated into the function. "Parameter values" describe the weight associated with at least one of the features of the encoded feature vector.

The item identification model 250 is trained using the training data set 260, which is made up of large volumes of historical features extracted for a number of labeled items. Each entry of the training data set 260 represents an item labeled with a known identification of them item, which may also be referred to as an "identification label." In one or more embodiments, the training data set is specific to a particular store; the training data set 260 may only store labeled features for items available in that particular store. In other embodiments, the training data set includes labeled features for a variety of items including those that are not currently available in the store but may become available in the future. The item recognition module 150 may predict items that may become available in the future based on known relationships between various items, for example as described above. An entry in the training data set 260 may further comprise features of that item, for example the color, shape, size of the item, or any other feature that contributed to the identification label of the item. During training, the item identification module 250 determines parameter values for each feature input to the item identification model 250 by analyzing and recognizing correlations between the features associated with an item and the labeled identification of the item.

As the identifications output by the item identification model 250 are verified by operators associated with the store or customers, the training data set 260 may be continuously updated with entries pertaining to newly listed items. In addition, the training data set 260 may be continuously updated as the appearance of certain items changes, for example changes to logos or packaging of an item. Accordingly, the item identification model 250 may be iteratively trained based on the updated data in the training data set 260 to continuously improve the accuracy of identifications output by the item identification module 250.

In one or more embodiments, entries within the training data set 260 represent items from a range of categories, for example frozen foods, canned goods, juices, etc. The item identification model 250 may be trained on such training data to generate a baseline model for each category. Depending on the location of the shopping cart 100 determined by the cart tracker 220, the item identification model 250 may select a particular baseline model. For example, if the shopping cart 100 is located in the frozen foods section, the item identification model 250 may select the baseline model for frozen foods and input the encoded feature vector to the selected baseline model. In such embodiments, the baseline model may be further trained using a particularized training data set comprising training data for the particular category of items. Accordingly, a baseline item identification model may be further trained to identify a particular category of items.

Periodically, the training data set 260 may be updated with entries of novel items or novel features extracted from items already labeled and stored in the training data set 260. Accordingly, item identification model 250 may be iteratively trained by inputting the features of the existing and novel items such that the model 250 continues to learn and refine its parameter values based on the new and updated data set 260. Iteratively re-training the item identification model 250 in the manner discussed above allows the model 250 to more accurately predict the classification of an item based on the features extracted from an image(s) of the item.

As discussed above, the item identification model 250 outputs an identification for an item captured in an image based on features of the item extracted from the image and the shopping cart itself (e.g., location). In one or more embodiments, the item identification model 250 identifies an item by determining a similarity score between the item and each candidate item identified by the item filtering module 230. The item identification module 250 identifies the item by identifying the candidate item corresponding to the highest similarity score. For example, where a shopping cart 100 is located in the fruit aisle, a user may place a banana (e.g., the item) in the shopping cart. The item identification model 250 may compare the item in the cart to each candidate item identified by the item filtering module 230 and determine a similarity score for each candidate item. Based on features of the item such as its yellow color and shape, the item identification model 250 may determine a higher similarity score between the item and a banana than the item and an orange or any other candidate item. Accordingly, the item identification model 250 identifies the item as a banana. When the item identification model 250 identifies an item, the item recognition module 150 updates the user's shopping list with the item and its identification and displays the updated shopping list to the user.

In one or more embodiments, the item identification model 250 compares the highest similarity score to a threshold score. If the highest similarity score satisfies the threshold score, the item identification model 250 identifies the item based on the candidate item corresponding to the similarity score. If the highest similarity score does not satisfy the threshold score, the item recognition module 150 may further determine a confidence score for its identification. If the features extracted for an item match the features of only one candidate item in the candidate item store 210, the item identification model 250 may determine a confidence score of 100%. Alternatively, if the features extracted for an item only partially match the features of a candidate item or match the features of multiple candidate items, the item identification model 250 may determine a confidence score less than 100%. Accordingly, the item identification model 250 may decrease the confidence score when it identifies multiple candidate items matching an item (e.g., multiple similarity scores within a threshold deviation) or when the item does not match any candidate items. For example, if the vector encoder 240 extracts features characterizing an item in an image as red and in the produce aisle, the item identification model 250 may identify the item as either an apple and a tomato. The item identification model 250 may further determine a confidence score for both candidate items—the apple and the tomato.

When the item identification model 250 determines multiple matches for an item (or determines a confidence score less than 100%), the item recognition module 150 may request user feedback via the user interface 110, for example a request for the user to confirm the identity of the item. In one or more embodiments, the item recognition module 150 may present all the identified candidate items to the user in a single display with a request for the user to select the correct candidate item.

In another embodiment, the item identification module 250 ranks the identified candidate items based on the confidence score determined for each candidate item. The item recognition module 150 may present only the highest ranked candidate item to the user via the user interface 110 with a request for the user to confirm the identity of the item. If the user confirms the identity of the item, the item recognition module 150 updates both the training data set 260 and the candidate item store 210 with the extracted features of the item and the confirmed identity of the item. If the user indicates that the identification of the item is wrong, the item recognition module 150 presents the next highest ranked candidate item to the user via the user interface 110 and again requests confirmation. The item recognition module 150 iterates through the ranked list of candidate items until the user confirms the identification of the item. If the user does not confirm any of the candidate items, the item recognition module 150 may request the user manually identify the novel item using the interface 110 and update the candidate item store 210 and training data set 260 with the novel item. In other embodiments, the item recognition module 150 may request the user manually identify the item using the interface 110 if the highest ranked candidate item does not match the item.

FIG. 3 is a flowchart illustrating an example method for identifying items in a shopping cart based on the location of the shopping cart within a store, in accordance with one or more embodiments. The item recognition module 150 accesses 305 an image captured by a camera 105 of an item inside a shopping cart 100 and a location of the shopping cart within the store. The camera may capture the image in response to a variety of trigger events including, but not limited to, a user placing an item in the shopping cart, the conclusion of a periodic interval, the shopping cart being moved a certain distance, or any other suitable trigger event. In one or more embodiments, the captured image contains a single item in the cart. In other embodiments, the captured image contains multiple items in the cart. In the latter embodiments, the item recognition module 150 may apply the techniques described herein in sequence or in parallel to identify each item in the cart.

For each item in the image, the item recognition module 150 encodes 310 a feature vector of the item based on one or more visual features of the item extracted for the image, for example the color, shape, and size of the item. In addition, the item recognition module 150 encodes 310 the feature vector using a feature representing the location of the shopping cart. For example, where the item is an orange, the item recognition module 150 may extract features characterizing the item as orange and circular. Additionally, the location of the shopping cart in the produce aisle indicates that the item is likely a fruit.

The item recognition module 150 inputs the feature vector encoded for an item to a machine-learning model to identify the item based on the features encoded in the feature vector. The machine-learning model compares features encoded in the feature vector to labeled features of items in the store to determine a confidence score between the item in the cart and each item in the store. To preserve processing power and encourage computational efficiency, the item recognition module 150 identifies 315 a subset of candidate items within the store based on the location of the shopping cart within the store. In this manner, the item recognition module 150 filters the candidates for matching the item in the shopping cart from all items available in the store to a subset of items in proximity to the shopping cart. In one or more embodiments, the item recognition module 150 defines a boundary around the shopping cart by extending radii in all directions from the shopping cart up to a threshold distance. The radii may be dynamically adjusted as the cart moves to ensure that items of a particular category, for example items in a particular aisle, remain within the boundary established for the shopping cart. Items within the boundary constitute the candidate items to be considered by the item recognition module 150 when identifying the item. In other embodiments, the item recognition module 150 determines distances between each item in the store and the shopping cart and ranks or sorts each item into tiers based on the distances. When identifying the item, the item recognition module 150 may consider candidate items above a certain rank or within a certain tier when identifying the item.

The item recognition module 150 inputs 320 the feature vector to machine-learning model to identify the item by determining similarity scores between the item and each candidate item of the set. The item recognition module 150 may iteratively train the machine-learning model using a training dataset of features corresponding to labeled items that is periodically updated with new items and new features for existing items. The machine-learning model compares features of the feature vector encoded for the item to labeled features of each candidate item to identify a match between the item and a candidate item.

If the item recognition module 150 identifies the item based on the similarity scores determined by the machine-learning model, the item recognition module 150 updates a shopping list of the items within the shopping cart with the identified item and displays 325 the list comprising the item and any additional items within the shopping cart to a user of the shopping art. If the item recognition module does not identify the item (e.g., the item matches multiple candidate items with a threshold confidence score), the item recognition module 150 may request manual confirmation of the item identification from the user of the shopping cart using any of the techniques described above.

Figure 4:
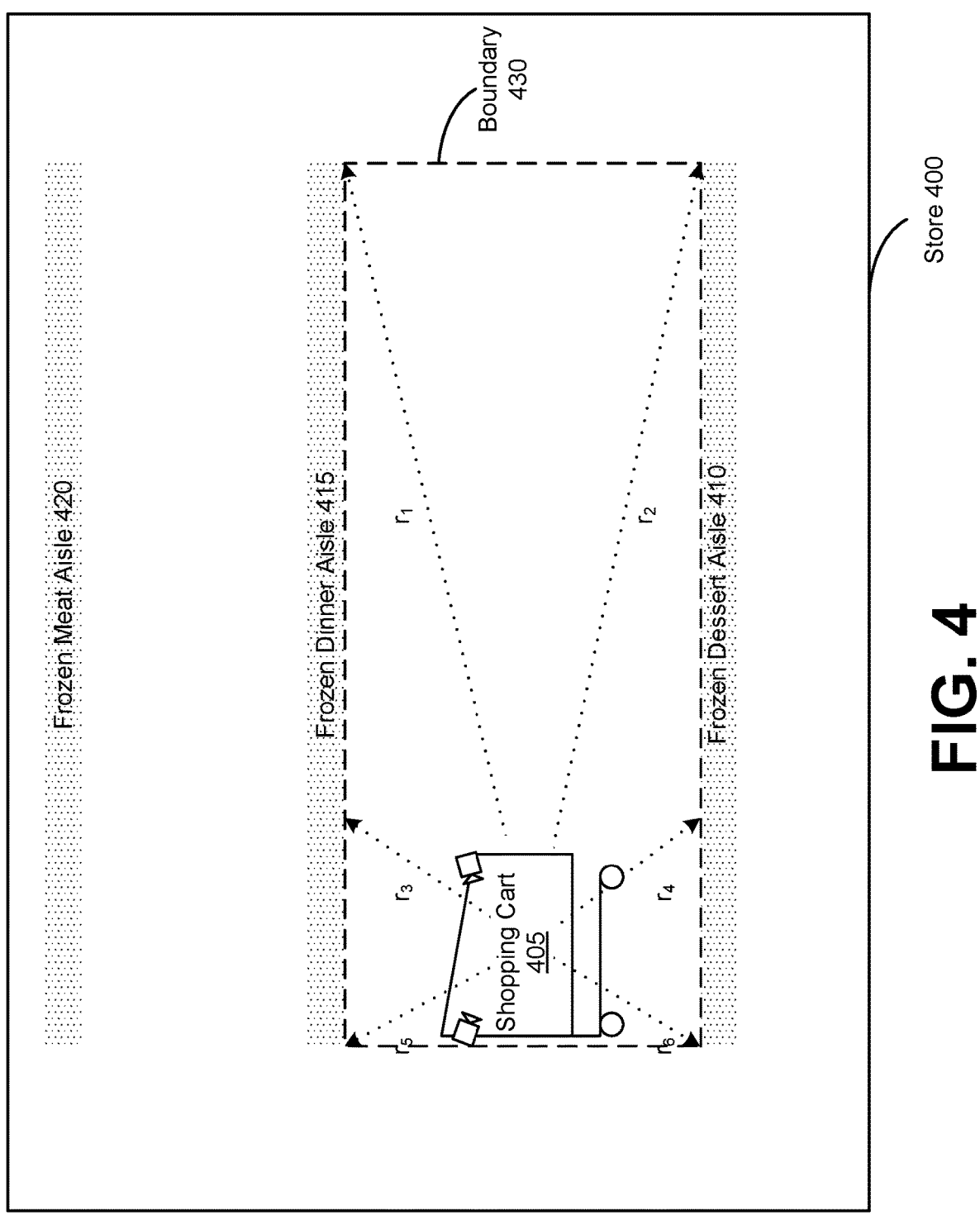
FIG. 4 illustrates an example shopping cart surrounded by items in a store, in accordance with one or more embodiments.

FIG. 4 illustrates an example shopping cart surrounded by items in a store, in accordance with one or more embodiments. The illustrated shopping cart 405 is located in the frozen foods section of a store 400 and, more specifically, the frozen dessert aisle 410 and the frozen dinner aisle 415. The frozen meat aisle 420 is located adjacent to the frozen dinner aisle 415. To identify the set of candidate items that could have been placed in the shopping cart 405, the item recognition module 150 determines a threshold distance and extends radii in several directions from the shopping cart to establish a boundary 430 within which all items are considered candidate items. The boundary 430 captures all items in the aisles 410 and 415 as candidate items but excludes items in the frozen meat aisle 420. To ensure all items in both the frozen dinner aisle 415 and the frozen dessert aisle 410 are included in the set of candidate items, r1 and r2 represent radii extending the threshold distance and r3, r4, r5, and r6 all represent radii extending less than the threshold distance. As the shopping cart 405 moves towards the opposite end of the frozen dinner aisle 415, r1 and r2 decrease in length while r5 and r6 increase in length to maintain the boundary 430 as capturing all items in the aisles 415 and 410.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising one or more computer-readable media containing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:

capturing an image of an item inside a cart using a camera coupled to the cart;

capturing location data using a location sensor coupled to the cart;

determining a location of the cart within a store based on the location data;

accessing the image of the item inside the cart and the location of the cart within a store, wherein the image comprises one or more visual features of the item;

identifying a set of candidate items located within a threshold distance of the location of the cart based on an item map describing a location of each item within the store, wherein a location of each candidate item of the set of candidate items corresponds to a location of the candidate item on the item map;

inputting the one or more visual features of the item and the location of the cart to a machine-learning model to identify the item by determining a similarity score between the item and each candidate item of the set of candidate items, the machine-learning model trained to identify items based on one or more visual features of the items and stored visual features of the items;

determining that the item does not match any of the set of candidate items based on the similarity scores determined by the machine-learning model;

extending the threshold distance to cover one or more adjacent aisles;

updating the set of candidate items with candidate items in one or more aisles that are adjacent to an aisle where the cart is located;

inputting the one or more visual features of the item and the location of the cart to the machine-learning model to identify the item by matching the item to a candidate item of the updated set of candidate items; and displaying a list comprising the item and additional items within the cart on a display device associated with the cart.

2. The method of claim 1, wherein identifying the set of candidate items within the store further comprises:

determining the threshold distance based on the location of a cart relative to an aisle of items based on one or more of:

a length of the aisle;

a number of items in the aisle;

an overall size of the store;

an overall number of items within the store; or a frequency with which users select items from the aisle.

3. The method of claim 1, wherein identifying the set of candidate items within the store further comprises:

defining a boundary around the cart by extending a plurality of radii from a center of the cart, wherein each radii of the plurality of radii differ in length but satisfy the threshold distance; and identifying the set of candidate items as all candidate items within the boundary around the cart.

4. The method of claim 3, wherein a first and second radii of the plurality of radii extend from the center of the cart to opposite ends of an aisle where the cart is located and each remaining radii of the plurality of radii is shorter than threshold distance.

5. The method of claim 3, further comprising:

dynamically adjusting the boundary around the cart as the cart moves from a first end of an aisle where the cart is located to a second end by reducing the length of a first subset of radii extending to the second end and increasing the length of a second subset of radii extending the first end.

6. The method of claim 1, wherein identifying the set of candidate items within the store further comprises:

determining a distance between each item in the store and the cart;

ranking each item in the store based on the distance between the item and the cart, wherein items closer to the cart are ranked higher than items farther from the cart; and identifying the set of candidate items by aggregating items ranked above a threshold rank.

7. The method of claim 6, further comprising:

assigning each item in the store into a plurality of tiers, wherein each tier represents a range of distances from the cart; and identifying the set of candidate items to be the items that are assigned to the tier of the plurality of tiers having a closest range of distances from the cart.

8. The method of claim 1, further comprising:

determining that the item does not match any of the set of candidate items based on the similarity scores determined by the machine-learning model;

responsive to determining that the item does not match any of the candidate items, identifying one or more secondary items related to one or more candidate items of the set of candidate items;

updating the set of candidate items with the one or more secondary items; and inputting the one or more visual features of the item and the location of the cart to the machine-learning model to identify the item by matching the item to a candidate item of the updated set of candidate items.

9. The method of claim 1, further comprising:

encoding a feature vector of the item based on the one or more visual features and the location of the cart; and inputting the feature vector to the machine-learning model to identify the item by determining a similarity score between the item and each candidate item of the set of candidate items.

10. A non-transitory computer-readable storage medium comprising stored instructions, that when executed by at least one processor, cause the at least one processor to:

capture an image of an item inside a cart using a camera coupled to the cart;

capture location data using a location sensor coupled to the cart;

determine a location of the cart within a store based on the location data;

access the image of the item inside the cart and the location of the cart within a store, wherein the image comprises one or more visual features of the item;

identify a set of candidate items located within a threshold distance of the location of the cart based on an item map describing a location of each item within the store, wherein a location of each candidate item of the set of candidate items corresponds to a location of the candidate item on the item map;

input the one or more visual features of the item and the location of the cart to a machine-learning model to identify the item by determining a similarity score between the item and each candidate item of the set of candidate items, the machine-learning model trained to identify items based on one or more visual features of the items and stored visual features of the items;

determine that the item does not match any of the set of candidate items based on the similarity scores determined by the machine-learning model;

extend the threshold distance to cover one or more adjacent aisles;

update the set of candidate items with candidate items in one or more aisles that are adjacent to an aisle where the cart is located;

input the one or more visual features of the item and the location of the cart to the machine-learning model to identify the item by matching the item to a candidate item of the updated set of candidate items; and display a list comprising the item and additional items within the cart on a display device associated with the cart.

11. The non-transitory computer-readable storage medium of claim 10, wherein the instructions for identifying the set of candidate items within the store further comprise instructions that cause the processor to:

determine the threshold distance based on the location of a cart relative to an aisle of items based on one or more of:

a length of the aisle;

a number of items in the aisle;

an overall size of the store;

an overall number of items within the store; or a frequency with which users select items from the aisle.

12. The non-transitory computer-readable storage medium of claim 10, wherein the instructions for identifying the set of candidate items within the store further comprise instructions that cause the processor to:

define a boundary around the cart by extending a plurality of radii from a center of the cart, wherein each radii of the plurality of radii differ in length but satisfy the threshold distance; and identify the set of candidate items as all candidate items within the boundary around the cart.

13. The non-transitory computer-readable storage medium of claim 12, wherein a first and second radii of the plurality of radii extend from the center of the cart to opposite ends of an aisle where the cart is located and each remaining radii of the plurality of radii is shorter than threshold distance.

14. The non-transitory computer-readable storage medium of claim 12, further comprising instructions that cause the processor to:

dynamically adjust the boundary around the cart as the cart moves from a first end of an aisle where the court is located to a second end by reducing the length of a first subset of radii extending to the second end and increasing the length of a second subset of radii extending to the first end.

15. The non-transitory computer-readable storage medium of claim 10, wherein the instructions for identifying the set of candidate items within the store further comprise instructions that cause the processor to:

determine a distance between each item in the store and the cart;

rank each item in the store based on the distance between the item and the cart, wherein items closer to the cart are ranked higher than items farther from the cart; and identify the set of candidate items by aggregating items ranked above a threshold rank.

16. The non-transitory computer-readable storage medium of claim 15, further comprising instructions that cause the processor to:

assign each item in the store into a plurality of tiers, wherein each tier represents a range of distances from the cart; and identify the set of candidate items to be items that are assigned into the tier of the plurality of tiers having a closest range of distances from the cart.

17. The non-transitory computer-readable storage medium of claim 10, further comprising instructions that cause the processor to:

determine that the item does not match any of the set of candidate items based on the similarity scores determined by the machine-learning model;

responsive to determining that the item does not match any of the candidate items, identify one or more secondary items related to one or more candidate items of the set of candidate items;

update the set of candidate items with the one or more secondary items; and input the one or more visual features of the item and the location of the cart to the machine-learning model to identify the item by matching the item to a candidate item of the updated set of candidate items.

18. A system comprising:

at least one processor; and memory storing non-transitory computer-readable storage instructions, that when executed by at least one processor, cause the at least one processor to:

capture an image of an item inside a cart using a camera coupled to the cart;

capture location data using a location sensor coupled to the cart;

determine a location of the cart within a store based on the location data;

access the image of the item inside the cart and the location of the cart within a store, wherein the image comprises one or more visual features of the item;

identify a set of candidate items located within a threshold distance of the location of the cart based on an item map describing a location of each item within the store, wherein a location of each candidate item of the set of candidate items corresponds to a location of the candidate item on the item map;

input the one or more visual features of the item and the location of the cart to a machine-learning model to identify the item by determining a similarity score between the item and each candidate item of the set of candidate items, the machine-learning model trained to identify items based on one or more visual features of the items and stored visual features of the items;

determine that the item does not match any of the set of candidate items based on the similarity scores determined by the machine-learning model;

extend the threshold distance to cover one or more adjacent aisles;

update the set of candidate items with candidate items in one or more aisles that are adjacent to an aisle where the cart is located;

input the one or more visual features of the item and the location of the cart to the machine-learning model to identify the item by matching the item to a candidate item of the updated set of candidate items; and display a list comprising the item and additional items within the cart on a display device associated with the cart.

\* \* \* \* \*